United States Patent [19]

McDonald

[11] 3,828,765
[45] Aug. 13, 1974

[54] GENITOURINARY TEST INSTRUMENT

[75] Inventor: Bernard McDonald, Malibu, Calif.

[73] Assignee: Medical Testing Systems, Inc., Beverly Hills, Calif.

[22] Filed: Nov. 24, 1971

[21] Appl. No.: 201,777

[52] U.S. Cl................................. 128/2 B, 128/304
[51] Int. Cl............................................ A61b 10/00
[58] Field of Search............ 128/2 B, 2 W, 2 R, 2 F, 128/304,

[56] References Cited
UNITED STATES PATENTS

| | | | |
|---|---|---|---|
| 839,641 | 12/1906 | Reavley | 128/304 |
| 1,669,395 | 5/1928 | Guttmann | 128/2 B X |
| 2,425,917 | 8/1947 | Brignola | 128/304 |
| 2,437,329 | 3/1948 | Moore | 128/2 B |
| 2,514,665 | 7/1950 | Myller | 128/2 B |
| 3,315,661 | 4/1967 | Groat | 128/2 B |
| 3,352,299 | 11/1967 | Sagiroglu | 128/2 B |
| 3,438,366 | 4/1969 | Kariher et al. | 128/2 B |
| 3,477,435 | 11/1969 | Artelli | 128/304 |
| 3,592,186 | 7/1971 | Oster | 128/2 B |
| 3,633,565 | 1/1972 | McDonald | 128/2 B |

Primary Examiner—Kyle L. Howell
Attorney, Agent, or Firm—Edward H. Loveman

[57] ABSTRACT

An inexpensive instrument for collection of genitourinary secretions, particularly for detection of gonorrhea in females is provided in practice of this invention. The elongated instrument has a head at one end for collection of samples from the cervical canal, and the other end has a head for sample collection within the urethra. In a preferred embodiment each head has a crescent-like cross section with an enlarged region on the convex side which tends to compress the wall of a body passage in which the head is inserted. A recessed region on the concave side exerts a decreased lateral pressure on the side of the passage. As the instrument is rotated within a passage the alternating increased and decreased pressures tend to "milk" various glands and ducts to induce and collect secretions.

7 Claims, 6 Drawing Figures

PATENTED AUG 13 1974 3,828,765
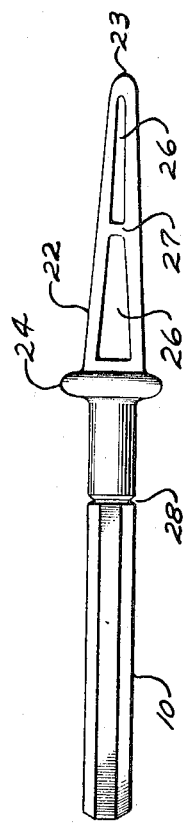
FIG. 1
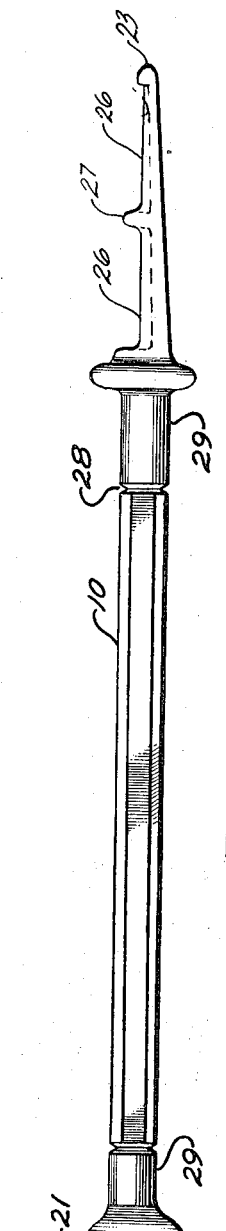
FIG. 2
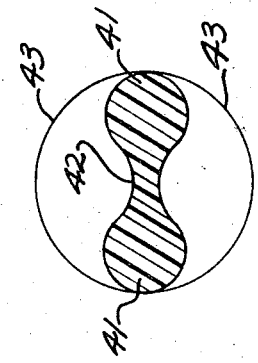
FIG. 5
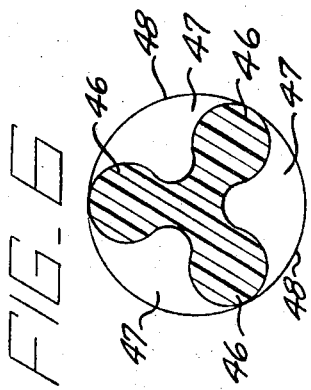
FIG. 6
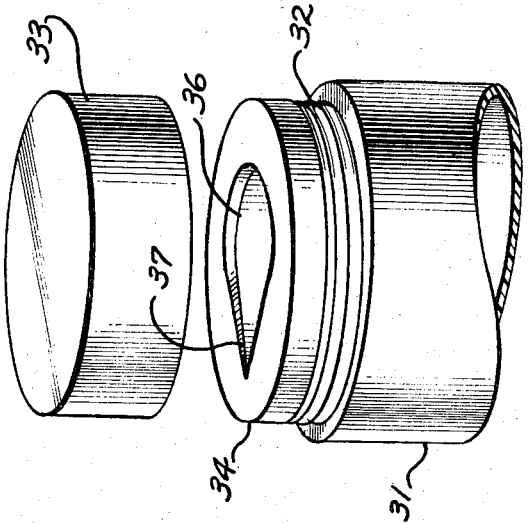
FIG. 4
FIG. 3
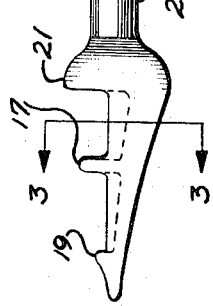

GENITOURINARY TEST INSTRUMENT

BACKGROUND

Gonorrhea is a difficult disease to detect in the female since the infection may yield only a non-specific discharge, and the situs may be internal and escape observation. Because of this, in the female the disease may progress to a chronic form without any awareness on the part of the victim. In chronic female gonorrhea the gonococcus organism typically retires to the recesses afforded by the peri-urethral glands, Skene's ducts, Bartholin's glands, and the cervical glands. Chronic gonorrhea may continue to escape detection even by a gynecologist or urologist unless special steps are taken to isolate and culture the organism.

Once the gonococcus organism has become substantially limited to these recesses in the chronic stage, merely brushing the genitourinary surfaces often fails to reveal the organism, either upon microscopic examination or by attempts at growth in special culture media. To successfully discover and identify the gonorrhea diplococcus, it is essential when taking a smear or culture to express mucous secretions, pus, fluid, or other material from the various glands and ducts of the uterus and urethra. Failure to extract such excretions will usually result in a failure to diagnose the disease and further dissemination thereof, which is believed to have reached almost epidemic proportions in some segments of the community.

There is, therefore, a distinct need for an instrument to facilitate and improve collection of secretions and other materials from the poorly accessible female genitourinary structures, particularly the endocervical and peri-urethral glands and ducts.

The gonorrhea diplococcus organism is surprisingly delicate, and care must be taken to quickly and reliably transfer it to a culture medium for successful identification. Clinical diagnosis of gonorrhea is also a somewhat risky procedure since the organism can be readily transferred to the eyes or other mucous membranes and result in infection. It is, therefore, desirable to provide a means for quickly and reliably transferring samples of genitourinary secretions to a culture medium without unduly exposing clinical personnel to the risk of infection.

BRIEF SUMMARY OF THE INVENTION

Therefore, in practice of this invention according to a presently preferred embodiment, there is provided a genito-urinary test instrument having a head portion on the end of the handle including means for milking genitourinary glands and ducts as the instrument is rotated in a genitourinary passage. This preferably comprises a cam-like portion along the length of the head for exerting an increased lateral pressure on the wall of the passage and a recessed region extending along the length of the head for exerting a decreased lateral pressure on the wall. The alternating increased and decreased pressure, as the instrument is rotated, tends to milk secretions from genitourinary glands and ducts. Partitions are provided for subdividing the recess into a plurality of recesses along the length of the head for accommodating different diameter genitourinary passages. A frangible region may be provided between the head and handle so that it can be readily broken off in a culture medium. A microorganism culture vessel may be used with an aperture for admitting the enlarged head of the test instrument, and a relatively smaller region on the aperture for preventing withdrawal, thereby breaking off the head at the frangible portion within a microorganism culture medium.

DRAWINGS

These and other features and advantages of this invention will be appreciated as the same becomes better understood by reference to the following detailed description of a presently preferred embodiment when considered in connection with the accompanying drawings wherein:

FIG. 1 is a side view of a test instrument constructed according to principles of this invention;

FIG. 2 is another side view of the instrument orthogonal to the view of FIG. 1;

FIG. 3 is a transverse cross section through the test instrument;

FIG. 4 is a perspective view of a microorganism culture vessel constructed according to principles of this invention;

FIG. 5 is a transverse cross section of another embodiment showing a variation in the shape of the head of the test instrument; and FIG. 6 is a transverse cross section of still another embodiment of test instrument constructed according to principles of this invention.

DESCRIPTION

FIGS. 1 and 2 illustrate in a pair of orthogonal side views a disposable genitourinary test instrument constructed according to principles of this invention. Preferably, the entire instrument is molded in a single piece of a suitable plastic material so as to be relatively rigid. The plastic has no other significant limitations except that it should be sterilizible by conventional techniques, and frangible by hand in a manner and location described in greater detail hereinafter. The plastic material should also be molded without burrs and generally with rounded edges so as to prevent injury to a patient. This minimizes removal of cells of tissue as would be used for a Pap test or the like and largely limits the sample to secretions.

The instrument is typically an elongated member about 200 millimeters long, and in the embodiments illustrated in FIGS. 1 and 2, the original drawings of this application are substantially to that scale, and the transverse dimensions are in general approximately to the same scale. The central portion 10 of the instrument is a hexagonal handle portion. When the instrument is in use it is rotated by hand, and any convenient non-round cross section for the handle portion is preferred. Thus, if desired, an enlarged, somewhat flattened portion may be provided at a convenient point along the length of the handle 10. At each end of the handle portion 10 is a specimen collecting head, each of which has certain similarities and certain differences.

One of the heads 11 is intended for use within the cervical canal of the uterus. The leading end 12 of the head is typically about 2 millimeters across, and is gently rounded for easy entry into the cervical canal. The cross section of the head then gradually and non-linearly increases to a maximum width of about 15 millimeters. This is sufficient for distending the cervical canal.

The head 11 is not round in cross section, but instead has a generally crescent-shaped cross section throughout the principal portion of its length, as seen in FIG. 3. Extending along the convex side of the cross section the central portion 13 is somewhat enlarged so as to serve as a cam-like projection. This cam-like projection 13 and the wings 14 of the crescent-like cross section tend to exert an increased lateral pressure on the tissue walls of a cervical canal when the instrument is in use.

Opposite the cam-like hump 13 is a closed recessed region 16 forming the concave side of the crescent-shaped cross section. The cam-like hump 13, wings 14, and recess 16 extend along the length of the head 11, and maintain approximately the same relative proportions, merely differing in size as the head tapers.

A raised, curved partition 17 divides the recess 16 from a similar recess 18 in the smaller portion of the head. The recess 18 has a cross-sectional shape like that of the larger recess 16. Near the tip 12 an end wall 19, having a shape substantially like that of the partition 17, closes the forward end of the recess 18. Nearer the largest portion of the head 11 a second end wall 21 closes the larger end of the recess 16 so that the head is subdivided into two similar recesses 16 and 18 extending along the length of the head and closed at their ends.

The test instrument is used by inserting the head 11 through the vagina into the cervical canal of the uterus. The cross section of the canal differs with various individuals and the head is inserted into the canal until a reasonable resistance to further insertion or patient discomfort is encountered. The instrument is then rotated so that the cam-like hump 13 and wings 14 exert a relatively increased lateral pressure on the walls of the cervical canal. The underlying tissue is somewhat rigid, and the superficial tissue within the passage is relatively soft and flexible. The cam-like portion therefore tends to compress the flexible tissue, squeezing the endocervical glands. As the instrument is rotated, a recess 16 or 18 passes before the same tissue recently compressed by the cam portion 13. The end walls 19 and 21 and the partition 17 tend to seal against the walls of the cervical canal, thereby inhibiting fluid flow longitudinally in the canal. The recesses, therefore, produce low pressure regions as the instrument is rotated. These low pressure regions tend to draw mucous, secretions, pus, and the like, from the glands, ducts, and folds within the cervical canal. As the instrument is rotated in the cervical canal, the alternating relatively higher pressure produced by the cam and lower pressure produced by the recesses tends to milk the hollow glands and ducts beneath the surface and the resultant fluid principally collects in the recesses.

The central partition 17 is provided since the cross section of the cervical canal differs for different individuals, and this assures that there is adequate sealing of the ends of the recesses against the walls of the canal so as to assure a substantial reduced pressure. In an individual with a relatively small cervical canal, the partition 17 and end wall 19 may seal against the walls, and secretions will be principally collected in the smaller recess 18. In an individual with a larger cervical canal, the partition 17 and larger end wall 21 may seal against the passage walls, and the secretions will be principally collected in the larger recess 16. In many individuals secretions will be withdrawn and collected in both recessed areas. It will be apparent that if desired additional intermediate partitions may be provided so that three or more recessed areas occur in the head for accommodating other variations in cross section of the cervical canal.

At the opposite end of the handle 10 a second head 22 is provided, similar in principle to the head 11. The second head 22 is employed for sampling secretions in the female urethra and has a cross section tapering gently from about 4 millimeters at its tip 23 to about 8 millimeters at its base. At the base of the head 22 there is provided a circular guard 24 which serves to prevent the instrument from being inserted too far into the urethra.

The urethral head 22 is provided with a pair of recesses 26 separated by an intermediate partition 27. The cross section of the urethral head 22 is substantially the same as the cross section of the cervical head 11, that is, it also is substantially as illustrated in FIG. 3. It differs only in the size. Since the cross section is the same and provides an enlarged portion and a recessed portion, rotation of the urethral head in the urethra tends to alternately apply pressure and suction on the periurethral glands and Skene's ducts, thereby tending to milk the ducts and glands and withdraw mucous, pus, and other secretions in the same manner as the cervical head 11. It helps in taking a urethral sample to press on the anterior wall of the vagina over the urethra with a finger while the instrument is being turned with the other hand.

Between the handle portion 10 and each of the heads 11 and 22 there is a reduced cross section region 28, preferably in the form of a relatively sharp notch. This provides a frangible portion between the handle and the head so that the head is readily broken off by hand after the instrument has been used. The configuration of the notch 28 is only indicated generally in FIGS. 1 and 2, and the minimum diameter will depend on the properties of the plastic selected for fabrication of the instrument. The frangible region 28 should be strong enough that there is substantially no danger whatsoever of breaking the instrument off during use, but weak enough to provide ready frangibility after a sample has been obtained. A short shank 29 is provided between the frangible portion 28 in each of the heads 11 and 22 so that the head can be grasped with forceps in case of accidental breakage. This elongated portion 29 also assists in immersing the head in a culture medium as hereinafter described.

FIG. 4 illustrates in perspective the top portion of a culture vessel particularly useful with the genitourinary test instrument hereinabove described. The culture vessel is in the form of a glass or transparent plastic bottle 31 within which is a suitable microorganism culture medium. Preferably the culture medium has a conventional agar base or the like so that it is not fluid, but fluid culture media can be employed if desired. A broad variety of conventional culture media may be provided in the bottle for growing cultures of the gonorrhea diplococcus or other organisms that may be encountered in the genitourinary area. Thus, for example, in cases where a fungal infection is suspected, a suitable growth medium for fungi may be employed.

At the top of the bottle a threaded portion 32 is provided for receiving a cap 33 or similar closure. Within and surrounded by the cap 33, when in place on the threads 32, is the mouth of the bottle which may be covered by a second intermediate cap 34, which, in the illustrated embodiment, is threaded onto threads (not shown) of a smaller diameter than the threads 32. The intermediate cap 34 and the outer cap 33 may be fixed or attached to the bottle in any of many other conventional manners. If desired, the mouth of the bottle may be formed in the process of manufacture with an aperture similar to that provided by the cap 34, and this inner cap can then be omitted.

The inner cap 34 has an aperture having a larger rounded end 36 and a smaller, somewhat pointed end 37 so as to have an overall drop shape. The edges of the aperture in the smaller portion 37 are preferably relatively sharp. The larger portion 36 of the aperture is sufficiently large to admit either of the heads 11 or 22 of a genitourinary test instrument as hereinabove described. The smaller portion 37 of the aperture is sufficiently small that it effectively prevents withdrawal of the head of the test instrument. The sharp edges on the narrow part of the slot may halp cut off the head.

Thus, in a typical usage of the test instrument, a sample of genitourinary secretions is obtained and then the head of the instrument is inserted through the large portion 36 of the aperture. This immerses the head with the secretions thereon in the culture medium within the bottle 31. The test instrument is then drawn to one side into the smaller portion 37 of the aperture, preferably with the sharp edges engaging the frangible notch 28 in the test instrument. Even if the notch is not engaged with the sharp edges, the aperture is small enough to prevent withdrawal of the head, and by twisting the instrument to one side relative to the bottle, the head is readily broken off at the frangible notch 28, thereby remaining within the culture medium. If the shank 29 of the head should catch on the edges of the aperture, it can readily be pushed loose and further into the culture medium with the broken stub of handle before it is discarded. When a sample is taken, either or both of the heads of the test instrument may be placed in the culture bottle.

Preferably for clinical use, the disposable genitourinary test instrument is sterilized and packaged in a sterile container, such as a plastic envelope, so it is ready for instant use. Similarly, the microorganism culture bottle 31 contains a sterile nutrient medium, and the cap 33 is sealed in place. When a sample is taken, the cap 33 is removed, the head of the instrument broken off within the bottle, and the cap placed loosely over the top to prevent contamination when it is placed in the culture growing oven. In this way, test samples can be quickly and reliably taken and immediately placed in a suitable growth medium without hazard to clinical or laboratory personnel.

FIGS. 5 and 6 illustrate in transverse cross section similar to FIG. 3 other embodiments of genitourinary test heads constructed according to principles of this invention. Each of these heads when rotated within a genitourinary passage alternately applies relatively increased pressure and relatively reduced pressure on the walls. As pointed out hereinabove, this alternating increased and reduced pressure tends to milk the ducts and glands within the genitourinary passages for obtaining samples of secretions.

Referring specifically to FIG. 5, the head throughout most of its length has a smooth "dumbbell" cross section having enlarged regions 41 running along opposite edges of the head. A somewhat narrowed waist 42 is provided between the enlarged portions 41 so as to provide a pair of opposed recessed regions. A partition or end wall 43 provides an end to the recessed regions, and as in the embodiment hereinabove described provides sealing to the wall of the passage for inhibiting fluid flow along the length. When a head having a cross section as illustrated in FIG. 5 is rotated in a genitourinary passage, the enlarged portions 41 apply increased pressure to the walls for squeezing the ducts and glands, thereby tending to express secretions therefrom. As the instrument is further rotated, the recessed regions encounter the glands recently compressed and apply a light suction thereto to help withdraw secretions therefrom.

FIG. 6 illustrates in transverse cross section another embodiment of genitourinary head having three enlarged portions 46 symmetrically arranged around the axis of the test instrument. A constricted region is provided inwardly of the enlarged portions 46 to define recesses 47 extending in an axial direction along the instrument. These recesses are ended by a partition or end wall 48, which serves to seal against the wall of the genitourinary passage, as hereinabove described. As a test instrument having a cross section as illustrated in FIG. 6 is rotated in a passage, the enlarged portions 46 and recessed regions 47 alternately press on and suck against the glands and ducts of the passage, thereby tending to extract secretions therefrom.

Generally speaking, the embodiment illustrated in FIG. 6 is preferable to that illustrated in FIG. 5 since this cross section has greater strength than the relatively flat cross section of FIG. 5, and further, the recesses 47 can be made somewhat deeper for greater differential pressure than is convenient in the embodiment illustrated in FIG. 5. It will be apparent to one skilled in the art that an additional number of cam-like regions alternating with suction-creating recesses can be provided in the head of a genitourinary test instrument. If the number increases too drastically, however, the differential pressures obtained may be diminished and less effective sampling may be obtained.

Although limited embodiments of genitourinary test system for gonorrhea diagnosis have been illustrated and described in detail hereinabove, many modifications and variations will be apparent to one skilled in the art. Thus, for just one example, instead of using a teardrop shaped aperture in the microorganism culture bottle, a key hole shaped slot serves admirably. Many other modifications and variations will be apparent to one skilled in the art, and it is therefore to be understood that within the scope of the appended claims the invention may be practiced otherwise than as specifically described.

What is claimed is:

1. A disposable genitourinary test instrument for collecting a specimen from a genitourinary passage by rotation therein to produce alternating increased and decreased pressures and thereby induce secretions from the glands therein; said instrument comprising,
   an elongated handle;
   a specimen collecting head located on one end of said handle;
   said head having a taper extending radially outward from the distal end of said head toward said handle and symetrically about the longitudinal centerline of said handle; and wherein said head has a general crescent lateral cross section shape substantially throughout its length; the concave side of said crescent shaped head having spaced end wall means extending laterally from said concave side of said crescent shaped head thereby defining a recess means for collecting said specimen when said head is inserted and rotated in said genitourinary passage.

2. A genitourinary test instrument as defined in claim 1 further including a frangible connection comprising a notch having a reduced cross section between said handle and said head.

3. A genitourinary test instrument as defined in claim 1 wherein said end wall means comprises three spaced walls and said recess means comprises two juxtapositioned recesses.

4. A genitourinary test instrument as defined in claim 1 further including another specimen head located at the other end of said handle, said another specimen head having a taper extending radially outwardly from the distal end of said head toward said handle and symetrically about the longitudinal center line of said handle; and wherein said another specimen head has a general crescent lateral cross section shape substantially throughout its length; the concave side of said crescent shaped another specimen head having spaced end wall means extending laterally from said concave side of said crescent shaped other head thereby defining a recess means for collecting said specimen when said another specimen head is inserted and rotated in said genitourinary passage.

5. A genitourinary test instrument as defined in claim 4 wherein said end wall means in said another specimen head comprises three spaced walls and said recess means in said another specimen head comprises two juxtapositioned recesses.

6. A genitourinary test instrument as defined in claim 5 further comprising a guard between said another specimen head and said handle said guard extending transverse to the length of said another specimen head for limiting the extent of insertion thereof into said genitourinary passage.

7. A genitourinary test instrument as defined in claim 4 further comprising a frangible connection between said handle and said another specimen head.

* * * * *